Dec. 25, 1962    J. J. LAREW ET AL    3,070,227
CONVEYOR CONTROL SYSTEM
Filed June 14, 1960    3 Sheets-Sheet 1
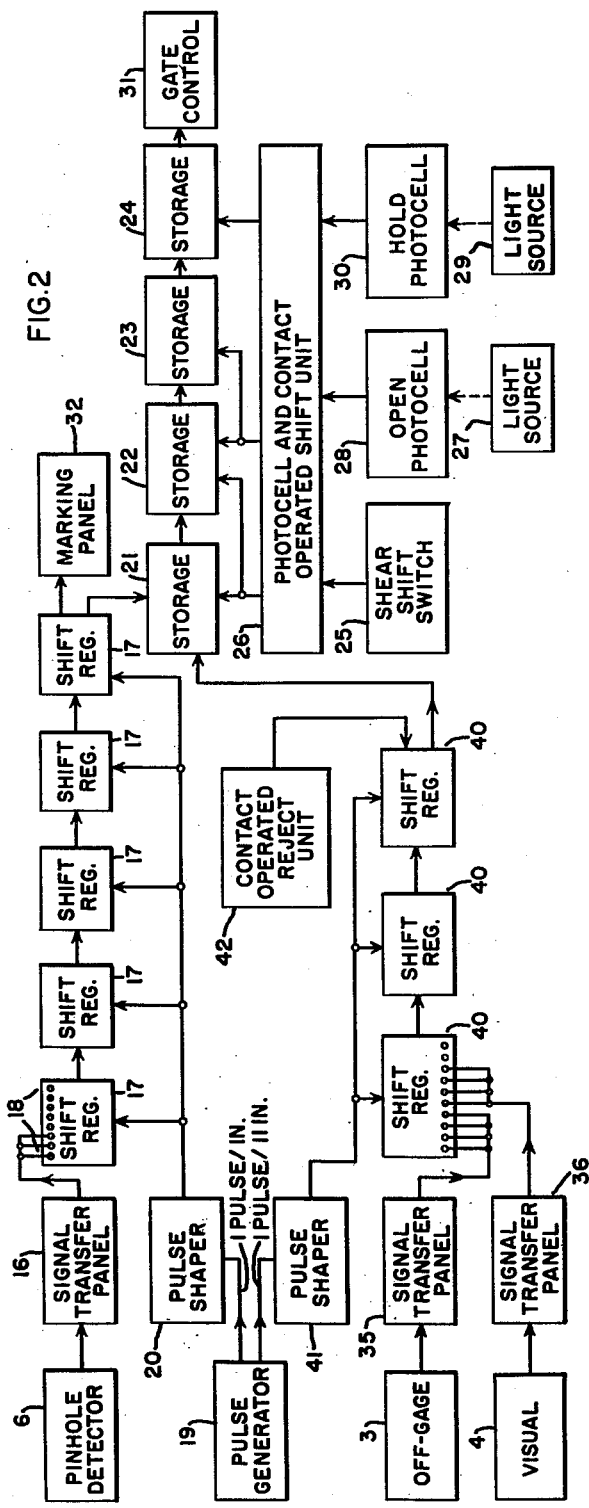
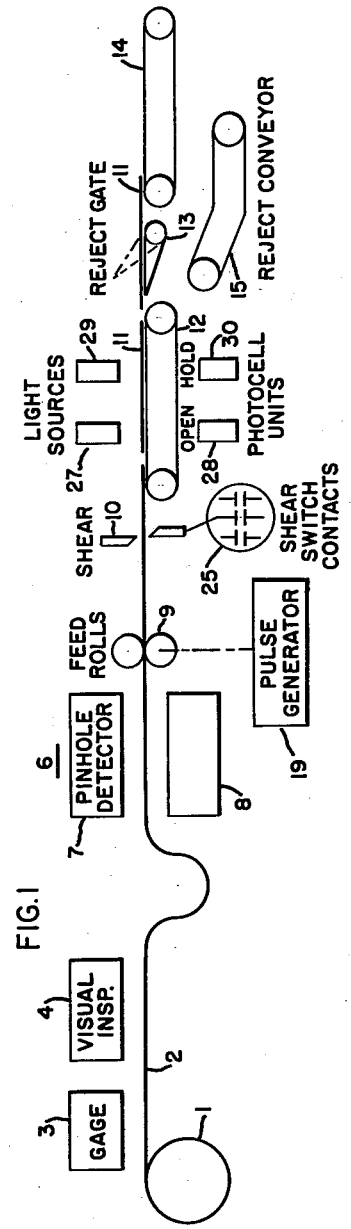
INVENTORS:
JOHN J. LAREW,
EARLE B. MCDOWELL,
BY *Melvin M. Goldenberg*
THEIR ATTORNEY.

Dec. 25, 1962 J. J. LAREW ET AL 3,070,227
CONVEYOR CONTROL SYSTEM
Filed June 14, 1960 3 Sheets-Sheet 2

INVENTORS:
JOHN J. LAREW,
EARLE B. McDOWELL,

BY *Melvin M. Goldenberg*
THEIR ATTORNEY.

Dec. 25, 1962 J. J. LAREW ET AL 3,070,227
CONVEYOR CONTROL SYSTEM
Filed June 14, 1960 3 Sheets-Sheet 3

INVENTORS:
JOHN J. LAREW,
EARLE B. McDOWELL,
BY Melvin M. Goldenberg
THEIR ATTORNEY.

United States Patent Office 3,070,227
Patented Dec. 25, 1962

3,070,227
CONVEYOR CONTROL SYSTEM
John J. Larew and Earle B. McDowell, Waynesboro, Va., assignors to General Electric Company, a corporation of New York
Filed June 14, 1960, Ser. No. 35,949
7 Claims. (Cl. 209—75)

This invention pertains to a novel article conveying system. More particularly, it pertains to a system for controlling the conveyance of articles subject to an inspection or other classifying operation and which are to be subsequently sorted.

In many industrial and commercial material handling operations, articles may be inspected or classified and subsequently carried by conveying means to a position proximate to receiving stations for sorting according to their classification. This requires the provision of some means to retain a controlling indication of the classification of the articles during the time required for the article to travel from the classification area to the sorting stations. In some instances, operations may be performed on the article after classification and it becomes very important that the indication retained be precise in its ability to control the subsequent sorting operation. Other complications may arise by virtue of the fact that in some instances the classification of the article may be determined by the existence of a number of different kinds of conditions existing in the article. Thus, in the case where a quality inspection is being carried out and the articles may be examined for a number of defects, the defects may be so radically different that the controlling indication retention means must be able to memorize different kinds of information to be effective to properly sort the articles.

An example of an industrial operation where the classification and sorting of articles involves all of these problems is to be found in the steel industry. In this industry shear lines are operated to cut coil strip material, such as tin-plated steel, into sheets. A shear line usually includes a means whereby coiled strip material is passed through a leveler and inspection area to a shear where it is cut to the desired length. A conveyor provided with diverter gates piles the sheets into prime and defective piles. Inspection is usually made for thickness, surface quality and pinholes. Errors in material thickness and surface flaws often extend over a considerable distance along the strip while pinholes are usually discrete flaws of small size. Since off-gage and surface blemishes usually extend over several sheets, it is relatively unimportant if a prime sheet is rejected along with several bad ones. In the case of pinholes, inasmuch as they usually affect only a single sheet it is much more important to make certain that only sheets containing holes are rejected. A normal arrangement is for the inspection stations to be located some distance ahead of the shear while the sorting station or diverting gate is some distance down the line from the shear. Therefore, it becomes important to "memorize" or retain a controlling indication of the flaw as it passes the inspection stations and follow its travel down the line to the shear. After shearing, the "memory" must be called upon to provide an indication of whether or not a flaw exists in the sheet formed by the shearing operation, and be effective to control the diverting gate to cause the sheet to be deposited in the proper pile.

In order to control the conveyors associated with such shear lines and similar operations, the "memory" and control systems have typically taken the form of a drum rotating in synchronism with the moving line and carrying a plurality of movable pins. Upon the detection of a flaw, means have been provided to move a pin outwardly so that as the drum rotates with the pin now moved outwardly, the pin will be effective at some point on its rotation to close a switch operating the diverting gate. Such a system has inherent limitations in its accuracy and its ability to properly divert sheets having both discrete flaws and flaws which may extend over several sheets. Whether it will properly reject all sheets having flaws extending over a large area where a visual inspection is made may depend on an operator's judgment and whether it will reject only those sheets containing discrete flaws becomes very questionable where the flaw is near the end of the sheet.

Therefore, it is an object of this invention to provide a novel control system for conveyors which includes "memory" means capable of accommodating diverse kinds of information to effect a controlling function at a subsequent time.

It is another object of this invention to provide a novel control system for conveyors which includes a "memory" means capable of handling information pertaining to very small areas of articles on the conveyor to effect a precise controlling function.

It is still another object of this invention to provide a novel control system for conveyors in which there are a minimum of moving parts subject to wear and requiring maintenance.

It is a further object of this invention to provide a novel control system for shear lines wherein information pertaining to the quality classification of sheet material and several inspections is memorized and effective at the appropriate location of the material in its travel down the line to operate diverting means to sort the material.

It is a further object of this invention to provide a novel control for a sheet classifier effective to accurately sort sheets sheared after several inspections and possibly having both discrete and extensive flaws.

Briefly, these and other objects of the invention are achieved in one form by the provision of a number of electrical signal translation stages together with means to insert in at least a first stage an electrical signal indicating a characteristic in an article such as the presence of a flaw. Means are provided for moving the signal through successive stages and maintaining it in one or more storage means until the article reaches a sorting area whereupon the signal is used to actuate means for sorting the article according to its characteristics.

The subject matter which we regard as our invention is particularly pointed out and distinctly claimed in the concluding portion of this specification. Our invention, however, both as to its structure and method of operation, together with further objects and advantages thereof, may best be understood by reference to the following description taken in connection with the accompanying drawing in which:

FIGURE 1 is a schematic illustration of a classifying conveyor with which our invention may be used;

FIGURE 2 is a block diagram of a conveyor control system embodying our invention;

Figure 3:
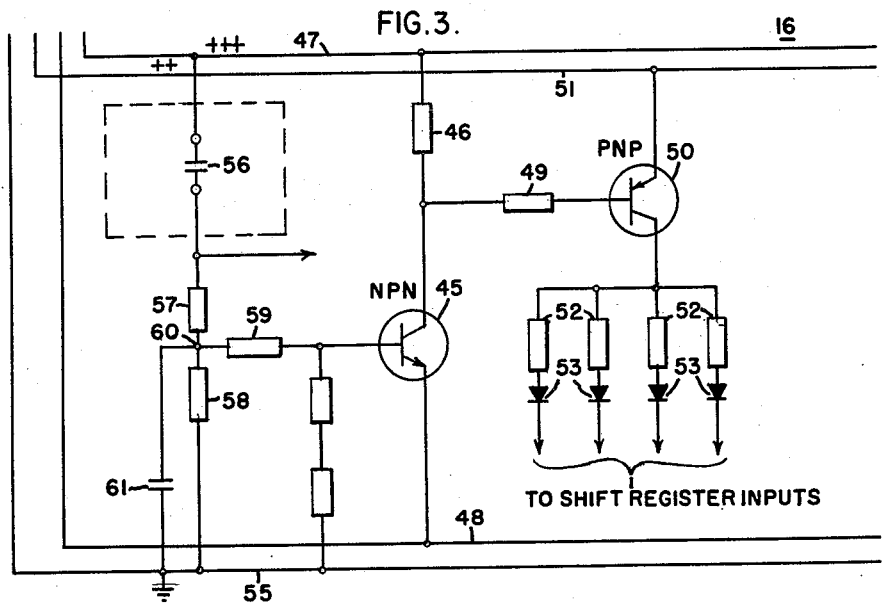
FIGURE 3 is a schematic illustration of a signal transfer circuit usable in our invention.

FIGURE 1 is the drawing illustrates schematically a tin plate shear line which can be operated to sort the sheets formed by shearing according to their classification after inspection into prime and defective piles. In such an application of our invention, the shear line is provided with means permitting the unwinding of a coil of tinplated steel 1. As the tin plate leaves the coil 1 in the form of strip material 2, it enters a classification area where several inspections may be carried out. Ordinarily these include a thickness or off-gage inspection carried out automatically by any suitable means shown schematically at 3, which means normally include elements for operating a contact in the event the material is not the proper thickness. Also, a visual inspection for surface quality may be carried out at a station illustrated schematically by reference numeral 4, and again electrical contacts are provided to be closed by the inspector to indicate the existence of a flaw of this type. In addition to these inspections, a pinhole detector may be provided as shown generally by reference numeral 6, which pinhole detector includes a light source 7 disposed on one side of the strip 2 and an inspection chamber 8 disposed on the other side of the strip 2. The inspection chamber 8 contains photoelectric devices responsive to light transmitted through pinholes in the strip 2 to provide an electrical pulse or operate electrical contacts when such a pinhole is detected. The unwinding of the strip 2 from the coil 1 may be caused by intermittently operated motor driven feed rolls shown at 9. The strip 2 is fed to a shearing device 10 and cut into sheets 11 of any desired length. A conveyor 12 is provided to receive the sheets 11 from the shear 10 and to carry them to a sorting area which usually includes a reject or diverter gate 13. Additional conveyors 14 and 15 may be provided to transport the sheets 11 to either a piling means for prime sheets or for defective sheets.

As described above, such an operation involves the detection of completely dissimilar types of flaws and the accurate sorting of the sheets formed from the strip according to their classification as prime or reject.

In order that such accurate sorting may be effected, our invention contemplates the provision of a control system illustrated in one embodiment in FIGURE 2. In this system, electrical signals are generated by the operation of electrical inspection devices 3, 4 and 6. A signal transfer panel 16 receives the signal indicating the presence of a pinhole and couples it to a number of signal translation stages or memory system constituted by a number of shift registers 17. One of the functions of the signal transfer panel is to convert an output pulse from the pinhole detector 6 into a suitable form for translation by the elements of the shift registers which, in a preferred form, are constituted by magnetic cores. It will be noted that a number of input terminals 18 are provided on the first shift register 17 and that the output of the signal transfer panel is supplied in parallel to three of these terminals. The advantages of this arrangement will be described in greater detail hereinafter. In order that the signals in the memory system may be effective to subsequently operate the reject gate 13, means are provided whereby they may follow the flaw in the strip 2 as it advances toward the shear 10. For this operation, a pulse generator 19 is driven by a suitable mechanical connection from the feed rolls 9 and provides driving pulses at a rate synchronous with respect to the movement of the strip to advance the classification signal through the shift registers 17 in synchronism with the movement of the flaw. A pulse shaper 20 may be provided to convert the output of the pulse generator 19 to the wave shape required to shift the signals in the shift register.

The number of shift registers 17 and the number of units such as magnetic cores in each shift register is, of course, a function of the distance between the pinhole detector 6 and the shear 10. If the material inspected consists of discrete articles rather than strip material which is subsequently sheared, then the number of shift registers is a function of the distance between the inspection station and the sorting area. Upon arrival of the portion of the strip 2 containing the pinhole at the shear 10, means are provided to store the flaw presence signal until the sheet 11 has reached the sorting area. This means is constituted by a number of storage units 21, 22, 23 and 24. Each storage unit may comprise a device having two stable states and may take the form of bistable transistor multivibrators. The flaw signal is transferred from the last shift register 17 to storage unit 21 and is held there until a switch 25 connected to the shear 10 is operated indicating a cut has been made. Upon transfer to any of the bistable storage units, the flaw signal causes it to be triggered out of its normal state. The switch 25 may be arranged to be closed only after the strip 2 has stopped moving and it opens before strip feed begins again after a cut. The closing of the switch 25 is effective to cause a shift unit 26 to generate a signal transferring the flaw signal to the storage unit 22, and at the same time the storage unit 21 is reset, ready to receive flaw signals when the strip 2 begins to move again.

A pair of photoelectric devices are provided to sense the presence of sheets between the shear 10 and diverter gate 13. The first photoelectric device comprises a light source 27 and a photocell unit 28 disposed adjacent the shear to have its light beam interrupted by the passage of a sheet. A second light source 29 and photocell unit 30 are similarly disposed but are located so as to indicate that a sheet 11 has substantially cleared the diverter gate 13. The outputs of the photocell units 28 and 30 are supplied to the shift unit 26. The photoelectric device constituted by source 27 and unit 28 may be considered an "open" beam while the device constituted by source 29 and unit 30 may be considered a "hold" beam. The "hold" beam prevents any action by the diverter gate 13 with respect to a sheet just cut until the previous sheet has moved sufficiently to clear the gate. The "open" beam senses the front edge of the sheet and initiates operation of the gate 13 as soon as the "hold" beam permits.

The operation of the "open" and "hold" beams is as follows. If no sheets other than the one just sheared are between the shear 10 and the gate 13, both the "open" and "hold" beams are established. The gate 13 will be operated to divert sheets from the conveyor 14 to the conveyor 15 as soon as a sheet containing a flaw intercepts the "open" beam, if a flaw signal has been transferred to the storage unit 21 from the last shift register 17 and from thence to the storage unit 22 by the action of the shear switch 25. This is accomplished by transferring the information in storage unit 22 directly through the storage units 23 and 24 to operate a gate control 31. The gate control may include a time delay circuit and switching means effective to cause the gate 13 to rotate to direct the defective sheet to the conveyor 15. The time delay in the gate control 31 is adjustable and may be adjusted to delay the gate operation sufficiently to prevent the gate from opening too early under the rear end of a good sheet as it passes over the gate. To reduce wear, it is desirable for the gate 13 to operate only when there is a change in the classification of the sheet moving past it. Thus, where a defective sheet is rejected, the gate 13 will remain in the same position so long as bad sheets are encountered and will not operate for each sheet unless only single defective sheets are encountered.

If a previous good sheet is interrupting the "hold" beam when the front edge of a bad sheet intercepts the "open" beam, the information in storage unit 22 is transferred to storage unit 23 and storage unit 22 is reset. Then when the good sheet blocking the "hold" beam passes, the beam will be re-established, the information stored in 23 will be transferred to 24 thereby operating unit 31, and the gate 13 will operate to reject the bad sheet just cut.

If desired, a marking panel 32 may be provided to receive flaw signals from the last shift register 17. The marking panel will then be effective to apply an identifying mark to those sheets containing pinholes to distinguish them from containing different types of flaws.

In order that the gate 13 may be operated to divert sheets containing flaws which are extensive in nature as contrasted to the discrete flaws detected by the pinhole detector 6, signals from the gate inspection station 3 and the visual inspection station 4 are supplied to signal transfer panels 35 and 36 respectively. The output circuits of the signal transfer panels 35 and 36 are coupled to a number of signal translation stages constituted by the shift registers 40. As in the case of the shift registers 17, each shift register 40 may be constituted by a number of magnetic cores wherein the number of stages and cores in each stage is a function of the distance between the inspection stations 3 and 4, and shear 10 or gate 13 and rate at which the information is moved from one stage to the next. Stage shifting pulses for the shift registers 40 are provided by the pulse generator 19 through a pulse shaper 41. Because of the more extensive nature of these kinds of flaws and because of the human reaction time required in the visual inspection, the need for accurate resolution does not exist. Thus, the pulse generator 19 is arranged to provide two different output signals with a fine signal being supplied to the pulse shaper 20 as described, and a coarse signal being supplied to the pulse shaper 41. By way of example, if the information in the shift registers 17 is translated at the rate of one pulse per one inch of movement of the strip 2, then it may be necessary to translate the information in the shift registers 40 at the rate of one pulse per eleven inches of movement of the strip 2.

Upon arrival at the last stage of the last shift register 40, the flaw information is transferred to the storage unit 21 and handled in the same manner to operate the gate 13 as was the flaw information from the last shift register 17. If desired, a manually operated contact unit 42 may be provided to divert sheets at the discretion of the operator.

It may be seen that the system contemplates means whereby completely different types of article classification may be used to sort articles on the same conveyor.

It has been pointed out above that the information from the signal transfer panel 16 is supplied in parallel to at least three stages of the first shift register 17, and it will be noted that this is also true of the information from the signal transfer panels 35 and 36. With respect to the translation of discrete information, this affords a distinct advantage. Thus, the scanning aperture of a pinhole detector has a definite width. Hence, a pinhole, even one as small as one mil, may produce signals just as it enters the zone of the aperture, just as it leaves, or even continuously as it crosses the aperture. This means that the location of the pinhole is not exactly described by the detector signal and a zone of uncertainty exists equal to the aperture width. In addition, other inaccuracies may exist such as the spacing between the detector 6 and the shear 10, and slip between the strip and the pulse generator. Therefore, if the signal from the detector is fed to more than one core simultaneously, the rejection of a defective sheet will be assured even if the hole occurs practically at the cut. In the case of the more extensive kind of flaw, parallel inputs to the shift register 40 insure that the visual inspector is "bracketed" and variations in the loop length of the strip 2 (see FIG. 1) are covered. Alternatively, the system may be arranged to extract information from the last three stages of the shift registers 17 and 40 to achieve these results.

In order that the operation of the invention may be more clearly understood, FIGURES 3 to 6 are shown to illustrate circuits which may be used in the panels discussed above. But, it must be appreciated that in many cases other circuits may be used and these figures are shown by way of illustration and explanation only.

Referring now to FIGURE 3 of the drawing, the circuit of a signal transfer panel such as might be used at 16, 35 or 36 is shown. In this circuit, a transistor 45 has its collector connected through load resistor 46 to positive voltage bus 47 while its emitter is directly connected to a bus 48, which is also at a positive voltage the value of which is less than that of the bus 47 but which is, nevertheless, sufficient to maintain the transistor 45 in a nonconducting state. The collector of the transistor 45 is also connected through a resistor 49 to the base of a transistor 50. The emitter of the transistor 50 is connected to a positive voltage bus 51 while its collector is connected to a plurality of parallel circuits, in this case four. Each parallel circuit comprises a resistor 52 and a diode 53 in series, and they in turn are connected to the input windings of the shift register magnetic cores as will be described hereinafter. Because the transistor 45 is normally maintained in a nonconducting state, the transistor 50 is likewise cut off and no current flows through the resistors 52. Connected between the positive bus 47 and a ground or zero bus 55 is a normally opened contact 56 in series with resistors 57 and 58. In the case of the signal transfer panels 35 and 36, such a normally opened contact may, in fact, be provided to be closed upon the detection of an off-gage or visual flaw, but in the case of the panel 16 this is intended to be only a symbolic representation of the output of a pinhole detector which is normally a positive pulse having an amplitude sufficient to cause the transistor 45 to conduct when applied to its base. As may be seen, the base of the transistor 45 is connected through a resistor 59 to the junction 60 of the resistors 57 and 58. A capacitor 61 is also connected to junction 60 and bus 55 in parallel with the resistor 58 and functions to filter the signal caused by the closing of contact 56 to prevent successive control signals from being supplied to the base of the transistor 45 during a signal switch closure as the result of contact bounce. When the contact 56 is closed, the base of transistor 45 becomes more positive and the transistor conducts. This in turn increases the base current on the transistor 50 causing it to conduct and current is passed through the resistors 52 and diodes 53 connected to input windings of the magnetic cores.

Figure 4:
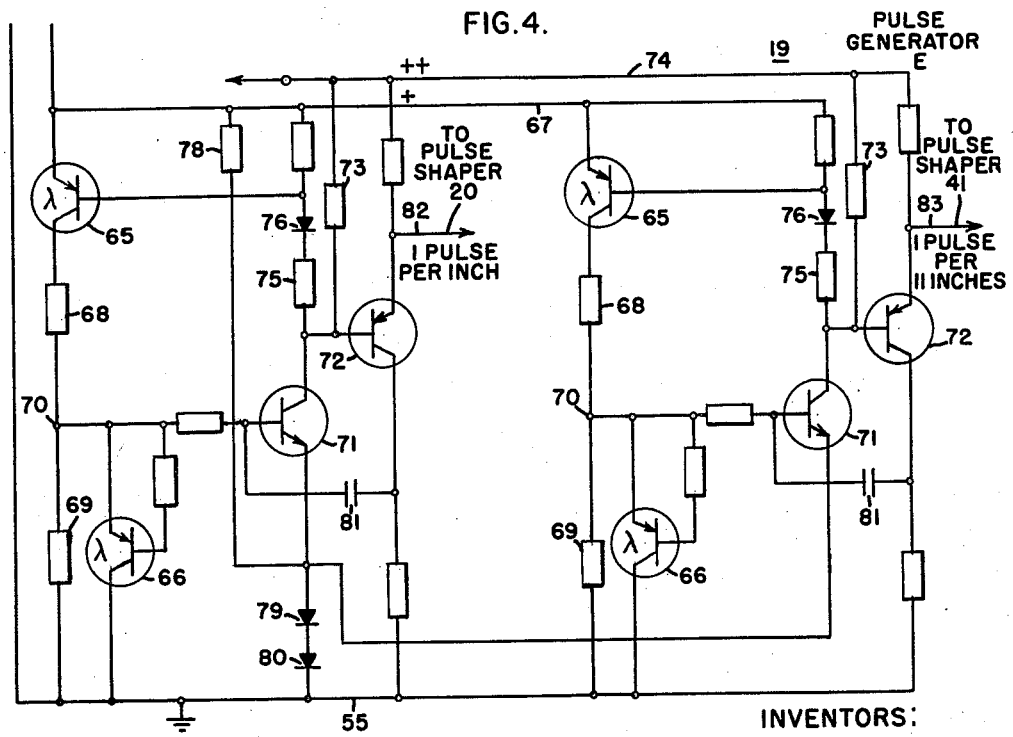
FIGURE 4 is a schematic illustration of a pulse generator usable in our invention.

In order that the information may be moved through successive signal translation stages in synchronism with the movement of the strip 2, a pulse generator such as shown in FIGURE 4 may be used. This may comprise a disc (not shown) coupled mechanically to a shaft which has a rotation proportional to the movement of the article. The disc is provided with slots in two separate channels. The slots in conjunction with a light source (not shown) may produce pulses at different rates for each channel. In the case of the fine shift registers 17, this may be at the rate of twenty-two electrical pulses per revolution for one channel and two electrical pulses per revolution for the other channel, and the disc should turn at the rate of one revolution for twenty-two inches of travel for the example given above. The pulse generator panel 19 comprises two identical circuits; therefore, it is only necessary to describe the arrangement and operation of one of them, and the corresponding parts will be given the same reference numerals.

The first or fine pulse generator circuit comprises a pair of phototransistors 65 and 66. The phototransistor 65 has its emitter connected to a positive bus 67 and its collector connected through a pair of resistors 68 and 69 to the ground bus 55. Connected to the junction 70 of the resistors 68 and 69 is the emitter of the phototransistor 66, the collector of which is connected to the ground bus 55. A pair of transistors 71 and 72 are provided. The collector of the transistor 71 is connected through a load resistor 73 to a positive bus 74, through a resistor 75 and through a diode 76 to the base of the phototransistor 65 and to the base of the transistor 72. A bias tending to maintain all of the transistors normally nonconducting is derived through dropping resistor 78 connected to the positive bus 67 and the junction of a pair of diodes 79 and 80 with the emitter of the transistor 71. A positive feedback connection is provided in the form of a capacitor 81 connected between the collector of the transistor 72 and the base of the transistor 71. An output connection 82 is provided at the emitter of the transistor 72 to the pulse shaper 20 while in the second circuit an output connection 83 is provided to the pulse shaper 41.

As pointed out above, the slotted disc coupled to the feed rolls 9 is provided with two sets of concentric slots.

If the circuit having as its output the conductor 82 is considered the fine pulse generator, then light from the set of slots producing twenty-two pulses per revolution will be arranged to impinge on its phototransistors 65 and 66. The phototransistors 65 and 66 are spaced so that as a slot moves light strikes 65 first then 66. Assume that the slots are in position so that no light falls directly on the phototransistors 65 and 66. In this case, all of the transistors are nonconducting, a condition which is insured by the current through resistor 78 and diodes 79 and 80. The slots are arranged and dimensioned so that light cannot strike phototransistors 65 and 66 at the same time. If light should strike the phototransistor 66, it would conduct if a voltage were present across it, but since phototransistor 65 is not conducting there is no voltage present on 66 and light impinging thereon has no effect on the circuit. When light falls on phototransistor 65, it will conduct. This causes the voltage on the base of transistor 71 to increase and this transistor conducts also. The increase in the collector current of transistor 71 causes a drop in its collector voltage. When the transistor 71 is nonconducting, its collector voltage is at a value whereby conduction by the diode 76 has been blocked. As the voltage on the collector of the transistor 71 drops, the rectifier 76 unblocks and current is drawn from the base of the phototransistor 65 further increasing the conduction of phototransistor 65 and, therefore, of transistor 71. As the result of this positive feedback, 65 and 71 are turned fully on with snap action. The drop in collector voltage of transistor 71 also acts to turn on transistor 72 which produces a negative going pulse on the output conductor 82 connected to its emitter. Capacitor 81 assists in the sharpening of the pulse wave shape by providing positive feedback between the collector of the transistor 72 to the base of the transistor 71. The output pulse on the conductor 82 will remain down until light strikes phototransistor 66 even though light no longer falls on phototransistor 65. Thus, even if a small amount of backlash exists between the moving article and the rotating disc and should result in a mechanical oscillation which could cause several rapid light pulses on the phototransistor 65, no false output pulses will be produced by the circuit.

When light falls on the phototransistor 66, this transistor conducts and shunts the base circuit of transistor 71 to ground. The bias voltage on the rectifiers 79 and 80 is then effective to cut off the transistor 71 and the snap action is now reversed. The net effect is to produce a series of square-wave pulses from the pulse generator as the slotted disc is rotated. The second or coarse circuit of the pulse generator operates in the same manner but produces pulse at its output 83 at a slower rate due to the lesser number of light pulses per disc revolution.

The pulse shapers 20 and 41 may take any suitable form well known in the art to produce the signal necessary from driving the shift register used. In the case of magnetic core shift registers, the shift pulse should be rather square and of short duration.

Figure 5:
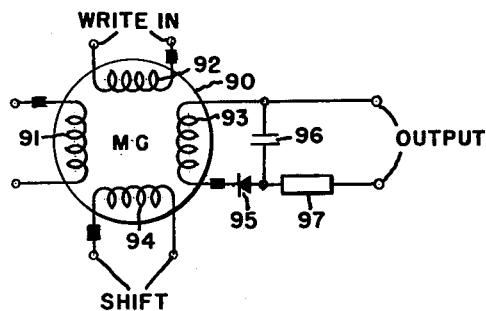
FIGURE 5 is a schematic illustration of a magnetic core usable in a portion of our invention.
Figure 6:
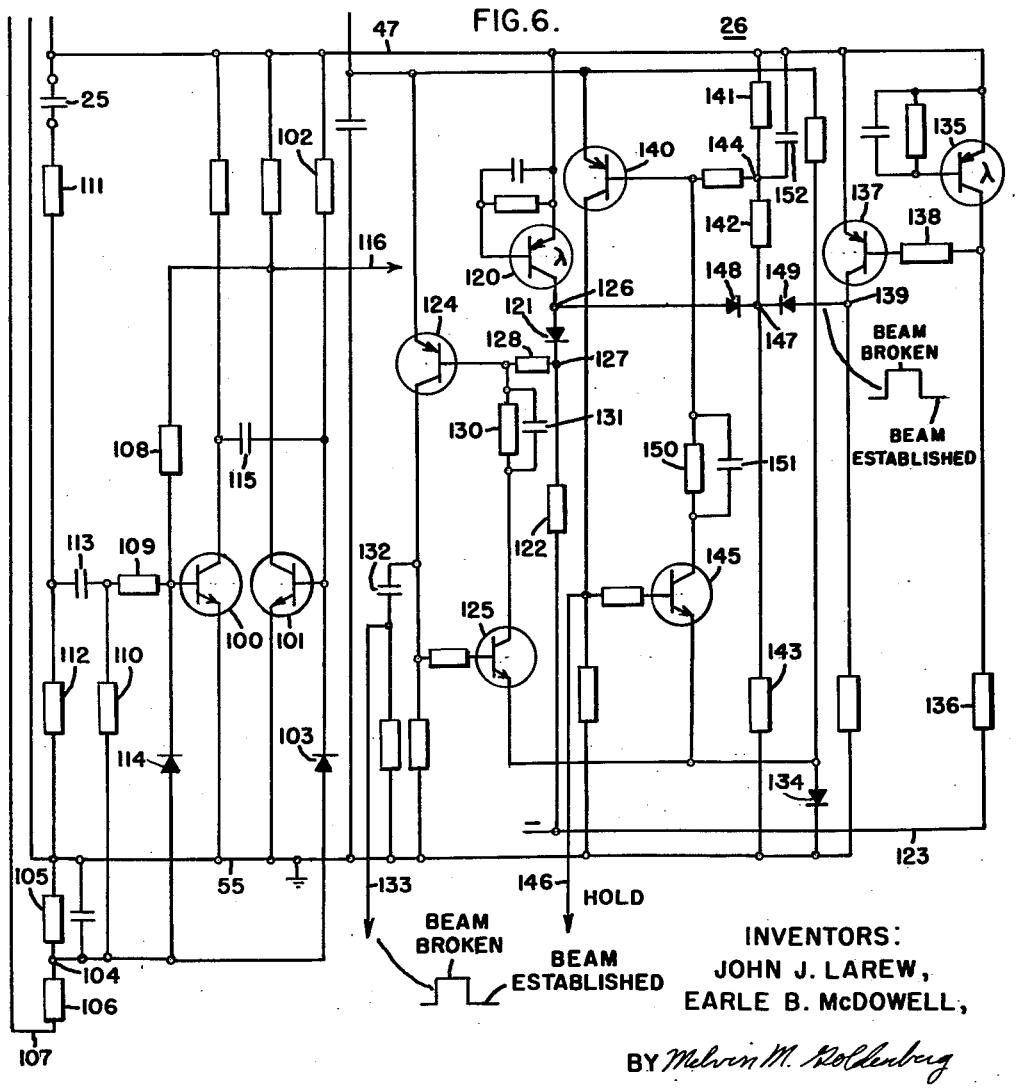
FIGURE 6 is a schematic illustration of a signal shift unit usable in our invention.

Although magnetic core shift registers are known in the art, it is believed appropriate to show and describe briefly one stage or "bit" of such a register to aid in the understanding of the invention. Thus, FIGURE 5 illustrates one such stage. This stage is constituted by a core 90 of a magnetic material which has a relatively square hysteresis loop. When a magnetizing current is provided to any one of four windings 91, 92, 93 or 94 on the core, the core will become magnetized permanently and will retain much of the magnetic flux even after the magnetizing is removed. Windings 91 and 92 may be used for "writing" information into the core and winding 94 to reset the core to its original state and shift the stored information to the next core. The shift pulse causes an output signal to appear on the remaining winding 93. Inasmuch as the core may be fully magnetized in either of two directions, it has the ability to store a binary "0" or "1" which in the case of the system illustrated in FIGURE 1 may be either "flaw" or "no-flaw." In order that the information may be shifted down, the register shift pulses are applied simultaneously to the windings 94 of all cores. If a particular core has been driven into saturation in one direction by the application of a flaw signal to the winding 92, successive flaw signals will have no effect and when a shift pulse is applied to the winding 94 the cores containing a flaw signal will be reset. Shift pulses are applied with a polarity to cause magnetization of the core with a polarity opposite to that caused by the flaw signal. The shift pulses are effective to drive the core to saturation and after the first shift pulse, successive pulses will have no effect unless additional "write" pulses are received between shift pulses. The output winding 93 will have voltages induced in it whenever the core flux is altered. If a flaw signal is applied to the winding 92, there will be a maximum flux reversal and an output voltage appears on the output winding 93 having a polarity such that it is blocked by rectifier 95 and substantially no voltage is developed across a capacitor 96. The shift pulse following such flaw signal will reverse the flux and cause a voltage of the opposite polarity to be passed by the rectifier 95 and used to charge the capacitor 96. The capacitor 96 serves as a temporary storage while the shift pulses are being supplied and the voltage thereon is thereafter effective to flow through a resistor 97 and the input winding 91 of the next core. As the cycle is repeated, any flaw information supplied to an input winding 92 will be moved down the register to appear at the last stage of the register and be supplied to the storage unit 21. For parallel reading out, any number of input windings 92 may be connected to receive signals through the resistors 52 and diodes 53. In the case of parallel readout, the output circuits of any number of output windings 93 may be connected in parallel, suitably isolated from each other, to the input of storage unit 21. Alternatively, any number of the otherwise unconnected windings 92 may be connected for this purpose.

The operation of the storage units upon the receipt of a flaw signal has been described above. The shift unit 26 which effects the signal transfers in the storage unit in response to signals from the contacts 25 and photocell units 28 and 30 is shown in detail in FIGURE 6. The first portion of this panel takes the form of a mono-stable multivibrator comprising a pair of transistors 100 and 101. Transistor 101 has its base connected through a dropping resistor 102 to the positive bus 47 and through a rectifier 103 to a junction 104 on a negative voltage divider constituted by resistors 105 and 106 connected between a negative bus 107 and the ground bus 55. The positive voltage thereby applied on the base of the transistor 101 maintains it in a conducting state and the transistor 100 is consequently held off because its base is held slightly negative by virtue of its connection to a voltage divider constituted by the resistors 108, 109 and 110 connected between the collector of the transistor 101 and the junction 104. The switch contact 25 is connected between the buses 47 and 55 through resistors 111 and 112. When the contact 25 is closed, a momentary positive pulse is produced on the base of the transistor 100 due to the differentiation of the voltage across the resistor 112 by the capacitor 113 and resistor 110. Transistor 100 is thereupon triggered on and a capacitor 115 couples a negative pulse to the base of the transistor 101 turning it off, further reinforcing the conduction of transistor 100 through the coupling between its base and the collector of transistor 101 provided by resistor 108. Transistor 101 will remain off until capacitor 115 discharges sufficiently for its base to become positive again. An output connection 116 is provided to supply the signal thereby developed on the collector of the transistor to the storage units 21 and 22. The photocell unit 28 and its associated portion of the panel 26 include a phototransistor 120 having its emitter connected to the positive bus 47 and collector connected through a diode 121 and a resistor 122 to negative bus 123.

With light falling on the phototransistor 120, that is with no sheet present, it conducts. Removal of this light reduces this conduction considerably except for leakage current. A transistor 124 has its base connected to the diode 121 and the conduction of phototransistor 120 with light applied is sufficient to positively bias this base and maintain the transistor 124 cut off. A second transistor 125 is maintained in a nonconducting state as the consequence of the voltage drop across a rectifier 134 connected to the ground bus 55. It will be noted that the base of the transistor 124 is connected through a resistor 128 and resistor 122 to the negative bus 123. When there is no positive voltage at the junction 126, transistor 124 will conduct and snap action is achieved by the positive feedback connection from the collector of transistor 125 through resistor 130 and capacitor 131. This causes a positive pulse to be coupled by a capacitor 132 to an output circuit 133 when the beam is broken and a negative pulse is so coupled when it is re-established. These pulses are supplied to the storage units 22 and 23.

A phototransistor 135 in the photocell unit 30 also conducts when light falls thereon developing an output voltage across resistor 136. This voltage is supplied to the base of a transistor 137 through a resistor 138. This voltage stops the conduction of the transistor 137 so that the voltage at a junction 139 connected to its collector is zero when light is present, but when the light is cut off rises to approximately the same voltage as that of the junction 126 when the phototransistor 120 is conducting.

A transistor 140 has its base connected to a junction 144 voltage divider constituted by the resistors 141, 142 and 143. The bias provided by this divider is such that transistor 140 conducts when there is no light on the phototransistor 120 and there is light on phototransistor 135. By virtue of the conduction of transistor 140, a transistor 145 is also conducting. With transistors 140 and 145 conducting, a positive voltage appears on an output connection 146. The junction 126 is connected to a junction 147 on the voltage divider through a rectifier 148 while the junction 139 is also connected to this junction through a rectifier 149. Conduction by phototransistor 120 or lack of conduction by phototransistor 135 causes the junction 147 to rise in voltage. With no light on phototransistor 140 and light on phototransistor 135, the rectifiers 148 and 149 are nonconducting due to the reverse bias from the divider. When the voltage at the junction 147 rises, the transistor 140 will be cut off and this in turn will cut off the transistor 145. Feedback through a resistor 150 and capacitor 151 will cause the cut off to be of the snap action type. The signal on the output circuit 146 will then be a square wave supplied to the storage unit 24. A capacitor 152 may be provided to introduce a slight delay in the change of voltage at the junction 147, which delay may be necessary when the phototransistor 135 is exposed to light and the light on phototransistor 120 is interrupted by the front edge of a sheet containing a flaw.

Briefly summarizing, it may be seen that the system includes means capable of sorting articles according to an established classification and which includes means to insure that articles classified in one category will not be diverted to a storage area intended for articles of another category.

Although in accordance with the provisions of the patent statutes this invention is described as embodied in concrete form and the principle has been explained together with the best mode in which it is now contemplated applying that principle, it will be understood that the apparatus shown and described is merely illustrative and the invention is not limited thereto since alterations and modifications will readily suggest themselves to persons skilled in the art without departing from the true spirit of the invention or from the scope of the annexed claims.

What we claim as new and desire to secure by Letters Patent of the United States is:

1. In an article conveying system including a plurality of receiving stations and means for diverting articles to selected ones of said stations, the improvement comprising means for determining the existence of a predetermined condition in any portion of the article and producing an electrical signal in the event such a condition is detected, a plurality of electric signal translation stages, the number of said stages being proportional to the distance between said condition determining means and the diverting means, means coupling said electrical signal to a plurality of said signal translation stages in parallel, means for advancing said electrical signal in each translation stage through succeeding translation stages in synchronism with the movement of the portion of the article manifesting such condition, and means responsive to the presence of said electrical signal in a last translation stage to operate said diverting means.

2. In an article conveying system including a plurality of receiving stations, means for diverting articles to selected ones of said receiving stations and an article classification station producing electric signals representative of the classification of the article, the improvement comprising a set of signal translation stages, means for supplying the electric signals to a plurality of said stages simultaneously, means for advancing said signals through succeeding stages in synchronism with the movement of the article, and means responsive to the presence of said signal in a last stage to operate said diverting means.

3. In an article conveying system including a plurality of receiving stations, means for diverting articles to selected ones of said receiving stations and an article classification station producing electric signals representative of the classification of the article, the improvement comprising a set of signal translation stages, means for supplying the electric signals to a plurality of said stages simultaneously, means for advancing said signals through succeeding stages in synchronism with the movement of the article, and means responsive to the presence of an article of one class adjacent the diverting means to operate said diverting means.

4. In an article conveying system including a plurality of receiving stations, means for diverting articles to selected ones of said receiving stations and an article classification station producing electric signals representative of the classification of the article, the improvement comprising a set of signal translation stages, means for supplying the electric signals to a plurality of said stages simultaneously, means for advancing said signals through succeeding stages in synchronism with the movement of the article, means disposed adjacent the diverting means to sense the presence of the articles, signal storage means to receive signals from a last stage, said sensing means being connected to said storage means to maintain signals representative of one classification therein until articles having another classification have cleared said diverting means, and means responsive to signals derived from said storage means to operate the diverting means.

5. In an article conveying system including a plurality of receiving stations, means for diverting articles to selected ones of said receiving stations, and a first and second article classification stations for producing electric signals representative of desired classifications of said articles, the improvement comprising a first set of signal translation stages, a second set of signal translation stages, means for coupling classification signals from said first and second article classification stations to a plurality of stages of said first and second sets of signal translation stages respectively, means for advancing said signals through succeeding stages in said sets to which they were coupled at different rates in synchronism with the movement of said article, and means responsive to the presence of classification signals in the last stage of any set to operate said diverting means.

6. In an article conveying system as set forth in claim 5 wherein each set of signal translation stages comprises a shift register and said advancing means comprising a pulse generator.

7. In an article conveying system as set forth in claim 6 wherein said pulse generator comprises a pair of phototransistors connected so that one of said phototransistors will not conduct unless the other of said phototransistors has first conducted, a transistor amplifier, connections between said transistor amplifier and said other of said phototransistors whereby said transistor amplifier conducts in response to conduction of said other of said phototransistors, and connections between said transistor amplifier and said one of said phototransistors whereby said transistor amplifier stops conducting in response to conduction of said one of said phototransistors.

References Cited in the file of this patent

UNITED STATES PATENTS

| | | |
|---|---|---|
| 2,732,896 | Lundahl | Jan. 31, 1956 |
| 2,862,617 | Brown | Dec. 2, 1958 |
| 2,873,855 | McCormick | Feb. 17, 1959 |
| 2,960,225 | Spingies | Nov. 15, 1960 |
| 2,938,194 | Anderson | May 24, 1960 |
| 2,950,640 | Camp | Aug. 30, 1960 |
| 2,990,965 | Smoll | July 4, 1961 |
| 2,993,596 | Steinbuch | July 25, 1961 |
| 3,000,519 | Purnell | Sept. 19, 1961 |

UNITED STATES PATENT OFFICE
CERTIFICATE OF CORRECTION

Patent No. 3,070,227                                            December 25, 1962

John J. Larew et al.

It is hereby certified that error appears in the above numbered patent requiring correction and that the said Letters Patent should read as corrected below.

Column 1, line 20, for "articles" read -- article --; column 2, line 66, for "is" read -- of --; column 4, line 54, for "where" read -- when --; line 75, for "gate" read -- gage --; column 10, line 62, strike out "a".

Signed and sealed this 5th day of November 1963.

(SEAL)
Attest:

ERNEST W. SWIDER

Attesting Officer

EDWIN L. REYNOLDS

Acting Commissioner of Patents